F. FRAME.
BRAKE.
APPLICATION FILED JULY 21, 1914.

1,136,788.

Patented Apr. 20, 1915.
2 SHEETS—SHEET 1.

WITNESSES

INVENTOR
Frank Frame
BY Munn & Co.
ATTORNEYS

F. FRAME.
BRAKE.
APPLICATION FILED JULY 21, 1914.

1,136,788.

Patented Apr. 20, 1915.
2 SHEETS—SHEET 2.

WITNESSES

INVENTOR
Frank Frame
BY
ATTORNEYS

UNITED STATES PATENT OFFICE.

FRANK FRAME, OF SAWYER, KANSAS.

BRAKE.

1,136,788.  Specification of Letters Patent.  Patented Apr. 20, 1915.

Application filed July 21, 1914. Serial No. 852,182.

*To all whom it may concern:*

Be it known that I, FRANK FRAME, a citizen of the United States, residing at Sawyer, in the county of Pratt and State of Kansas, have invented certain new and useful Improvements in Brakes, of which the following is a specification.

My invention relates to brakes of a type admitting of general use, but of special service in connection with wagons, carriages, automobiles, cars and other vehicles, the more particular purpose of my improvement being to provide an improved construction of brake wherein the rotation of a wheel of the vehicle furnishes most of the motive power for actuating the brake.

My invention further contemplates an improved type of balanced brake—that is a brake in which the parts are so proportioned that no undue stresses of any kind have much effect upon the brake lever under direct manual control of the operator, and in which the brake shoes or rub blocks are readily thrown into and out of action.

Reference is made to the accompanying drawings forming a part of this specification, and in which like letters indicate like parts.

Figure 1:
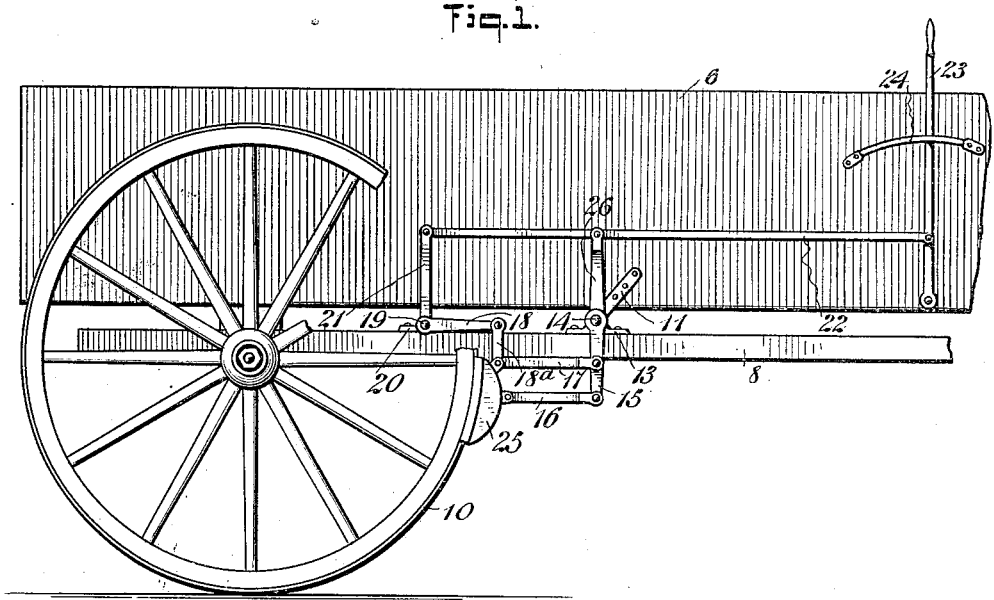
Figure 2:
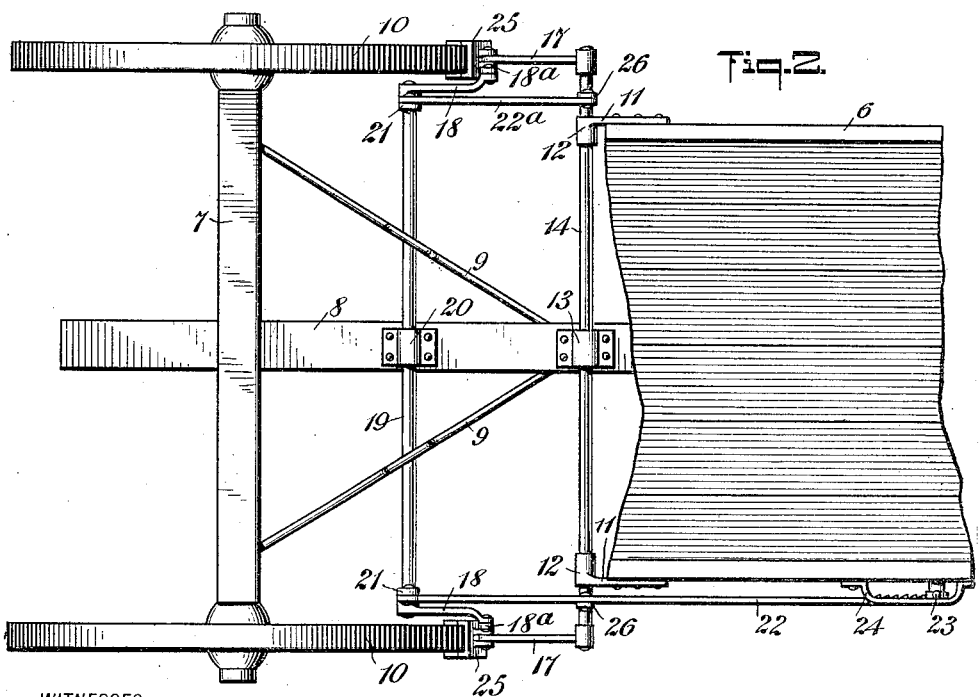
Figure 3:
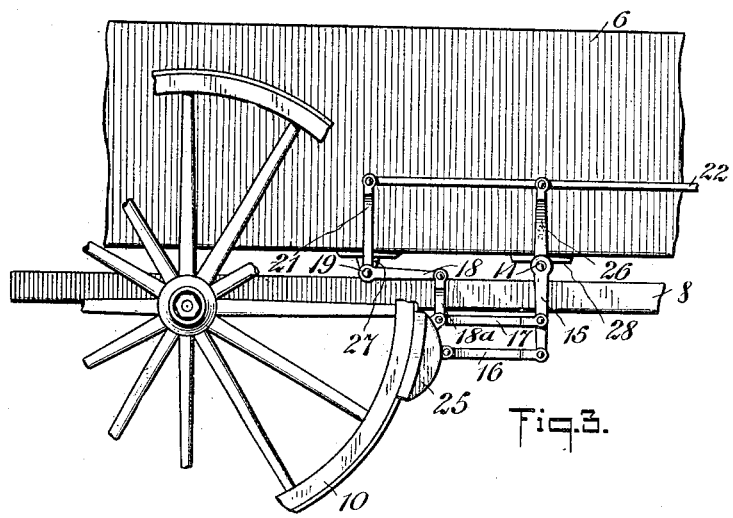
Figure 4:
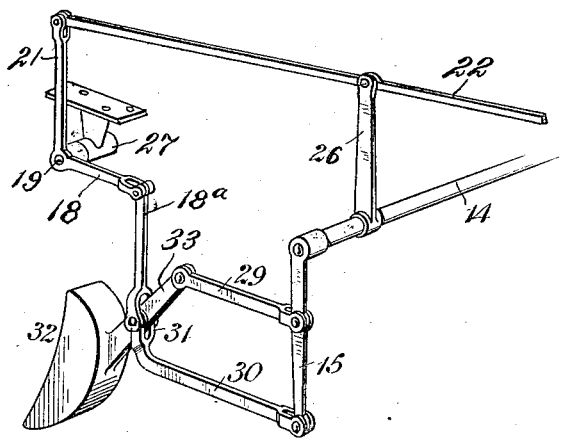

Figure 1 is a fragmentary side elevation of a vehicle equipped with my improved brake; Fig. 2 is a fragmentary plan view of the same; Fig. 3 is a fragmentary side elevation showing a slightly different mounting for my improved brake mechanism; and Fig. 4 is a perspective showing another form of my brake, in which the connections to the brake shoe are slightly different from those appearing in Figs. 1 to 3 inclusive.

A vehicle body is shown at 6, a rear axle at 7, and a coupling pole at 8. A pair of hounds is shown at 9, and extend from the coupling pole to the rear axle. The rear wheels appear at 10. A bracket 11 is secured upon each side of the vehicle body 6 and provided with an annular bearing 12. Mounted rigidly upon the coupling pole 8 is another bearing 13. Extending through this bearing and the bearings 12 is a rocking shaft 14, and mounted rigidly upon the ends of this rocking shaft are two arms 15. These arms extend downwardly and at their lower ends are each pivotally connected to two links 16, 17. Near the link 16 are two arms 18 and pivoted to these arms are two links 18ª. The arms 18 are secured rigidly upon a rocking shaft 19. A bearing 20, mounted upon the coupling pole 8, engages this shaft 19 and supports the same. Mounted rigidly upon the shaft 19 and extending upwardly from it are arms 21. A rod 22 is pivotally connected to the upper end of one arm 21, and also pivotally connected to a hand lever 23, the latter serving the purpose of a brake lever. A guard 24 of arcuate form is mounted rigidly upon the vehicle body 6, and extends adjacent the path of travel of the lever 23. The brake shoes, sometimes designated as rub blocks, are shown at 25, and are suspended from the links 18ª, in close proximity to the wheels 10. Mounted rigidly upon the shaft 14, and extending upwardly therefrom, are two arms 26, one of which is pivotally connected with the rod 22, and the other of which is pivoted to a rod 22ª in turn pivoted to the upper end of the other arm 21, at the opposite side of the vehicle.

Normally the brake shoes 25 are out of engagement with, yet disposed in close proximity to, the adjacent surfaces of the wheels 8, the upper end of the brake lever 23 being at the limit of its travel to the left according to Fig. 1. When, however, the operator desires to set the brakes, he grasps the hand-lever 23 and by moving it forward—that is to the right according to Figs. 1 and 2—it causes the arms 21 and 26 to rock, so that the links 16, 17, push the brake shoes 25 into engagement with the wheels 10, and in so doing, cause the brake shoes to rock slightly in a clockwise direction, according to Fig. 1. These wheels, by their rotation, have a tendency to move the brake shoes 25 slightly downward. This is because the brake shoes, by their engagement with the wheels, cling to the surfaces thereof and thus tend to follow the wheel slightly as if to rotate with it. This rocks the arm 18, the shaft 19, and the arms 21, so that motion is communicated to the arm 26, and this causes the shaft 14 to rock clockwise, or to the right according to Fig. 1. The rocking of the shaft 14, as just mentioned, forces the links 16, 17, to the left according to Figs. 1 and 2, so that the brake shoes 25 are forced into still closer engagement with the wheels 10.

The various arms 15, 18, 21 and 26 are of equal length, and because of this fact the various stresses effecting the brake shoes, while in action are quite evenly balanced, in so far as they may effect, or be effected by, the control of the lever 23. Because of the equality in the length of the arms just mentioned another important purpose is accomplished, namely, the exertion required to actuate the lever 23 is almost negligible, the power employed for actuating the brake being furnished, practically in its entirety, by the rotation of the wheels 10. The net result is that if the vehicle be going down hill, the application of the brake virtually diverts runaway energy into braking energy, and the operation of the brakes is in this instance, accomplished so as to be in every sense automatic except as regards its easy control by the hand-lever.

In some instances, as indicated in Fig. 3, I arrange a few of the parts somewhat differently, the essential principles, however, remaining the same. The shaft is here supported upon the under side of the vehicle body by a bearing 27, in which it is journaled. The shaft 14 is similarly journaled in a bearing 28, also carried by the under side of the vehicle body. Except for the fact that the two shafts 14 and 19 are here supported by the vehicle body, the structure and action of the various parts, is the same as above described with reference to Figs. 1 and 2.

In the form disclosed in Fig. 4 the connections for the brake shoe are somewhat different. Two links 29, 30 are pivotally connected with the arm 15. The link 30 is provided with an upturned end portion 31, having the form of a fork. The brake shoe is shown at 32, and is provided with an arm 33 rigid with it and extending obliquely upward from it, this arm being pivotally connected with the link 29 and with the upturned portion 31 of the link 30. Except as just noted, the connections of the brake shoe and adjacent parts are the same as above described with reference to Figs. 1 and 2.

When the rod 22 is moved to the right, according to Fig. 4, the brake shoe 32 is forced into engagement with the adjacent wheel 10, and rotation of this wheel thereupon tends to carry the brake shoe bodily downward. This causes the action above described with reference to Figs. 1 and 2, the brake shoe being forced into closer engagement with the wheel.

With any form of my device, relaxation of the hand lever, and parts controllable thereby, causes the brake shoes to be disengaged from the wheels.

The operation of my device will be readily understood from the foregoing description. The parts being assembled and arranged as described, the operator merely uses the hand-lever as he would any other brake lever. A comparatively slight pressure upon the hand-lever causes the brake shoes to be forced against the wheels with a degree of energy proportionate to, but vastly greater than, the degree of energy applied to the hand lever.

I do not limit myself to the precise construction shown, as variations may be made therein without departing from the spirit of my invention.

Having thus described my invention, what I claim as new and desire to secure by Letters Patent is:—

1. In a brake, the combination of a rocking shaft, means controllable by hand for actuating said rocking shaft, an arm connected rigidly with said rocking shaft, a pair of links pivotally connected with said arm, a brake shoe connected with said links, another link connected with said brake shoe, an arm connected with said second mentioned link, a rock shaft carrying said arm, another arm mounted upon said rock shaft and connected from said last mentioned arm to said first mentioned rock shaft.

2. In a vehicle provided with a wheel, a rock shaft, means under the control of an operator for actuating the same, a brake shoe in operative connection with said shaft and adapted to be forced into frictional engagement with said wheel in one directon of shaft rotation, and a supplemental rock shaft in operative connection with said shoe and with said shaft actuating means for rotating said first named shaft still further in the same direction to force said shoe into binding engagement with said wheel when moved therewith through said frictional engagement.

In testimony whereof I have signed my name to this specification in the presence of two subscribing witnesses.

FRANK FRAME.

Witnesses:
GARDNER W. COLBURN,
LOUIS FRAME.

Copies of this patent may be obtained for five cents each, by addressing the "Commissioner of Patents, Washington, D. C."